Mar. 20, 1923.

1,449,264

W. H. CANNARD ET AL

FEEDING AND CUTTING MECHANISM

Filed Jan. 30, 1922        3 sheets-sheet 1

Inventors
William H. Cannard, and
Glenn A. Shaffer.

By
Attorney

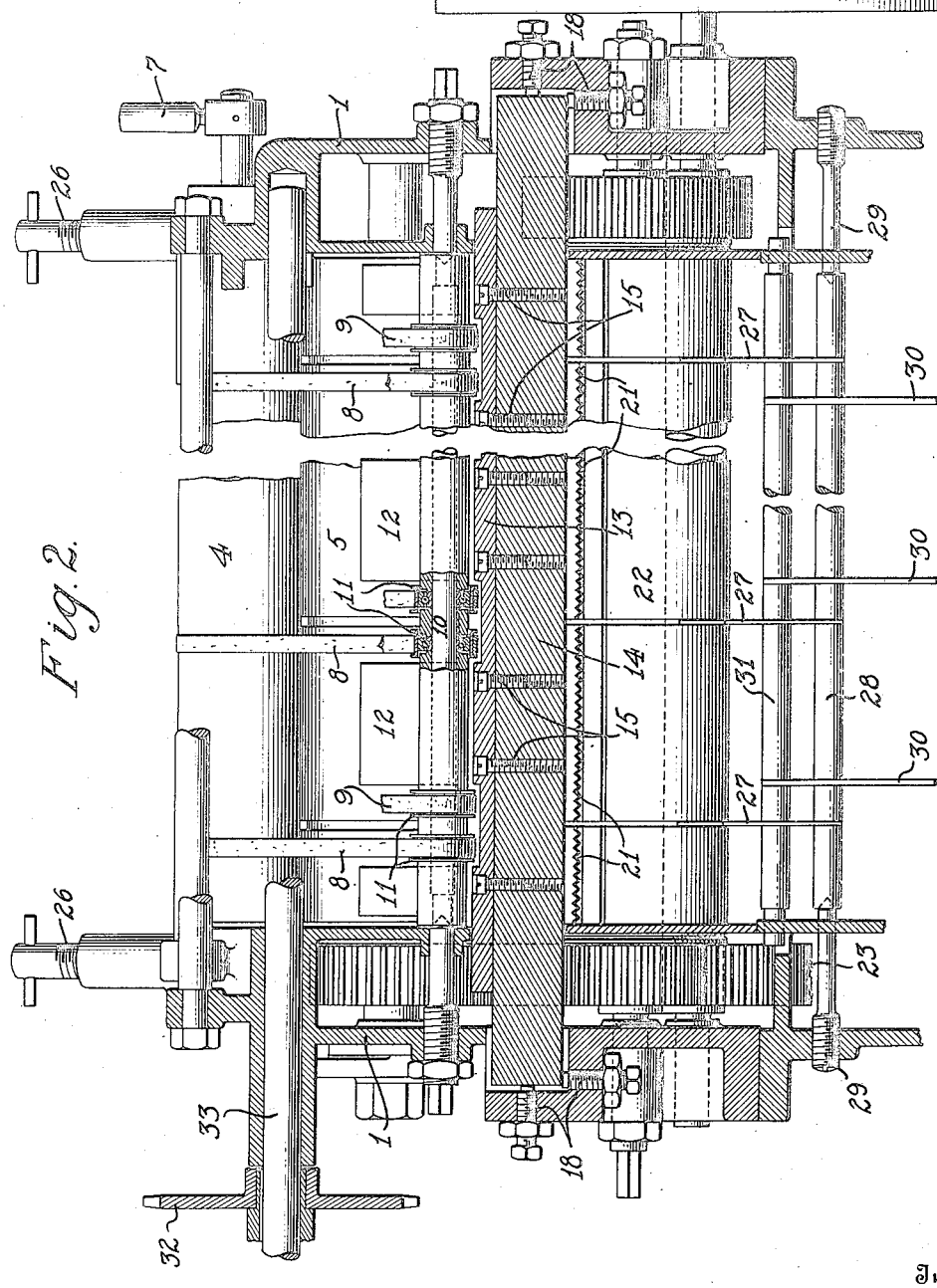

Mar. 20, 1923.
1,449,264
W. H. CANNARD ET AL
FEEDING AND CUTTING MECHANISM
Filed Jan. 30, 1922   3 sheets-sheet 3

Inventors
William H. Cannard, and
Glenn A. Shaffer.

Patented Mar. 20, 1923.

1,449,264

UNITED STATES PATENT OFFICE.

WILLIAM H. CANNARD AND GLENN A. SHAFFER, OF GREEN BAY, WISCONSIN, ASSIGNORS TO SAID CANNARD.

FEEDING AND CUTTING MECHANISM.

Application filed January 30, 1922. Serial No. 532,774.

*To all whom it may concern:*

Be it known that we, WILLIAM H. CANNARD and GLENN A. SHAFFER, citizens of the United States, residing at Green Bay, in the county of Brown and State of Wisconsin, have invented certain new and useful Improvements in Feeding and Cutting Mechanism, of which the following is a specification, reference being had therein to the accompanying drawing.

This invention comprises an improved feeding and cutting mechanism. While its application is unrestricted, it is especially useful in connection with the feeding and cutting of material taken in web form from a roll and fed to a machine adapted to operate upon the cut web, such, for example, as the interfolding machine illustrated and described in our pending application Serial No. 504,023. This present application is a continuation in part of the parent application, and is directed to the specific feeding and cutting mechanism shown rather diagrammatically in that application.

It is contemplated among the objects of the invention to provide a feed which will be simple, easily accessible, and wherein material, in web form, may be readily fed or threaded into the machine and, when so started, will be positively directed, maintained in predetermined alinement, and positively and intimately presented to any surfaces of coacting members which are to act upon the web. The arrangement is such that a plurality of webs may be fed at one time, and the rolls are arranged so that a counting mechanism may be associated therewith merely by the insertion of an additional roll and a drive-connection to a source of power. The placement of the rolls and the interaction of the associated guiding and holding means are arranged with a view to minimize any danger of tearing the web or catching a portion of it in projecting members, thus clogging and endangering the working parts of the machine.

It is contemplated as a further object of the invention to provide a cutting mechanism so coacting with the feeding mechanism that a plurality of webs may be cut alternately in such a manner that the end of one sheet will be located in approximately the middle of another sheet and carried along in this arrangement until acted upon by an interfolding mechanism or the like.

It is also contemplated to provide a cutter in which there are a plurality of coacting cutting instrumentalities so coacting that a centrally disposed one is acted upon by other cutters placed on opposite sides of the central member and the webs fed on either side of the central member; wherein the blades of the outside cutters are placed on rotating rolls and the central cutter is maintained in stationary relation thereto and acted alternately upon by the rotating blades; and wherein both the blades on the rolls and coacting knife surfaces on the stationary cutter are adjustable in a variety of ways, so as to insure a positive registering of the cutting surfaces of the knives and the taking up of any wear. These are important features of the present invention, for so far as we are aware, we are the first to provide a central cutting member adapted to have webs of material fed down on opposite sides thereof and coacting cutter members adapted to shear off the webs either together or alternately on coacting knife parts arranged on opposite sides of the central cutting member. It makes for efficiency heretofore impossible in interfolding machines wherein the cutting was done by coacting roller cutters, or wherein a stationary blade coacted with a rotating cutter, only one web being handled at a time.

Other objects and advantages will in part be apparent and in part be brought out more fully in the description which follows.

The accompanying drawings illustrate one embodiment of the invention wherein the general principles are set forth, in rather general terms, for the mere purpose of illustration.

In these drawings:

Fig. 2 is a view in transverse section on the line 2—2, Fig. 1;

Figure 3:
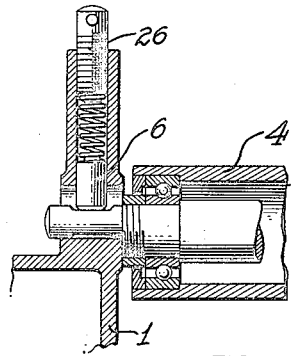
Fig. 3 is a detail view in vertical section showing a form of feed-roll mounting.

In these drawings, the reference-character 1 denotes a casing or support upon which are mounted guide-rolls 2, adapted to receive and direct material, such as a web, taken from stock-rolls 3. These rolls are preferably arranged in pairs, the guide-rolls being in the form of idlers, rotating freely and mounted suitably in bearings disposed on opposite ends of the casing. From the stock-rolls the web passes over the guide-rolls and thence between the bight of coacting feed-rolls 4 and 5. These are also arranged in pairs on opposite sides of the center line of the casing and mounted suitable in bearings at the opposite ends of the casing. Provision is made for quickly separating rolls 4 from the coacting rolls 5 for the purpose of facilitating the threading of the web into the machine, and as here shown there is a spring-pressed plunger 6, best seen in Fig. 3, normally contacting with a reduced and flattened portion on the end of the shaft which supports the roll 4. This portion is set eccentrically to the rest of the shaft, and the opposite end of this shaft carries a handle 7, turning of which lifts the roll and permits passing freely of the web therethrough. The same action is provided for on the opposite side between the corresponding rolls. Coacting with these feed-rolls are guiding-belts 8 and 9, each passing around and arranged on opposite sides of a centrally-disposed shaft 10, which carries bearings 11, upon which the belts are guided and freely rotate.

Figure 1:
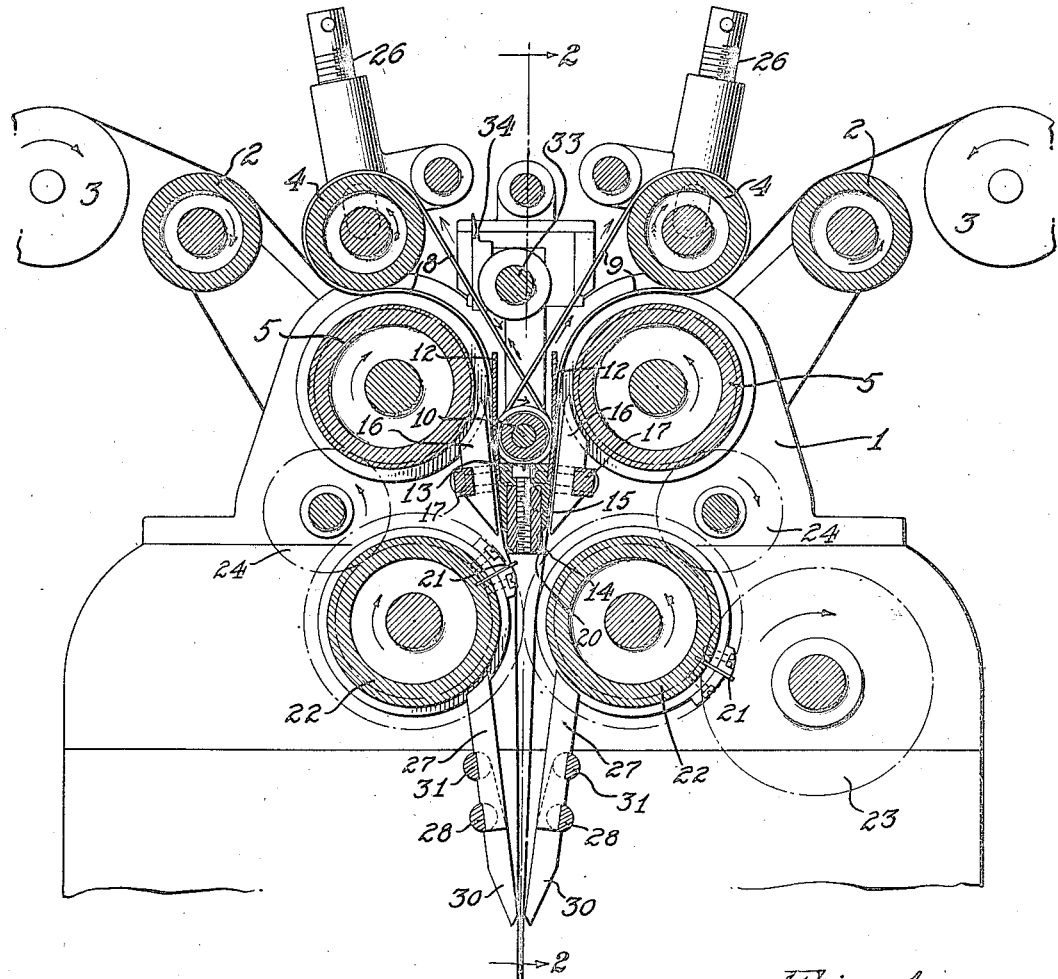
Figure 1 is a view in vertical section through a machine including feeding, counting, and cutting instrumentalities constructed and arranged in conformity with certain principles of our invention.
Figure 4:
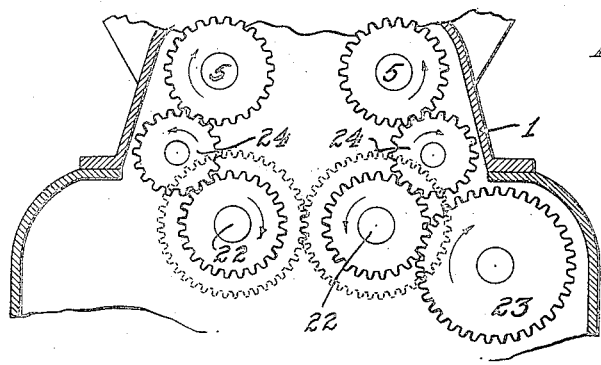
Fig. 4 is a diagrammatic view illustrating one form of gearing connecting the feed-rolls and coacting parts.
Figure 5:
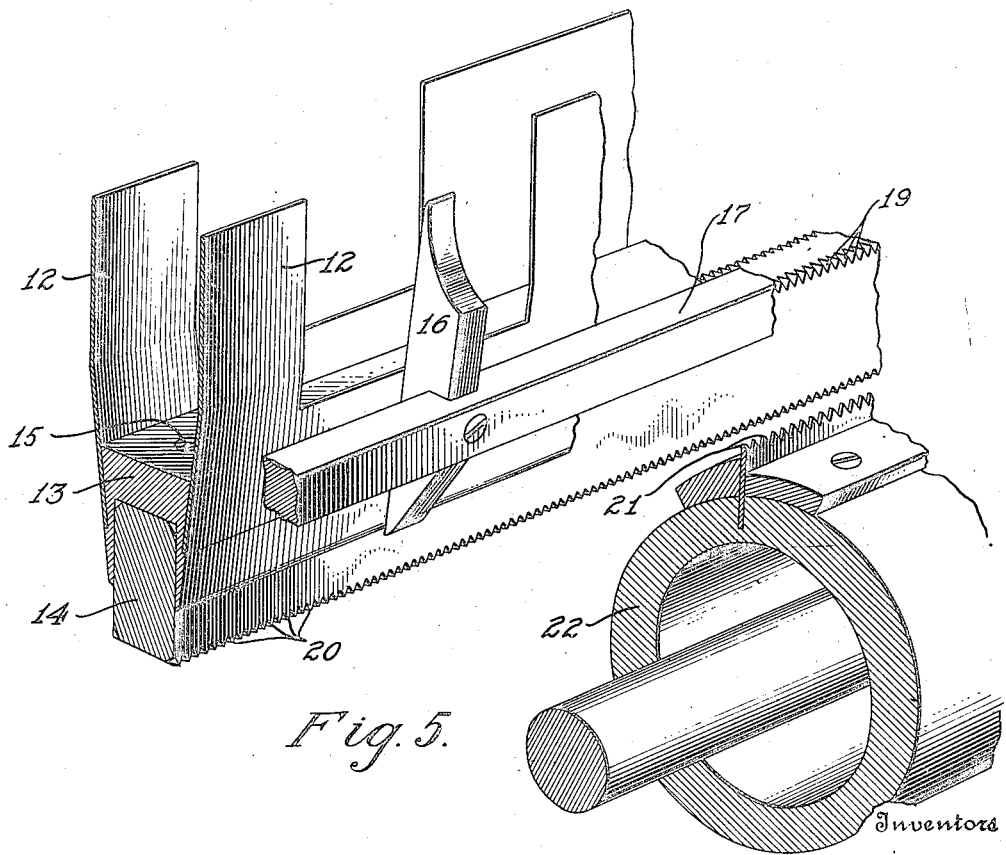
Fig. 5 is a view in perspective, certain parts being broken away, and illustrating the arrangement of a portion of a web-guiding instrumentality, a stationary cutter, and co-action therewith of a rotating blade disposed on one side thereof.

The centrally-disposed feed-belt carrying roll 10 is arranged between guide-members 12 extending upwardly from a cutter-casing 13, which is in turn mounted on a cutter-bar 14. The cutter-casing is secured suitably to the cutter-bar, as by screws or the like 15, threaded into openings in the cutter-bar. The upwardly-extending members 12 constitute web-guides, and coact with the belts 8 and 9 in directing the webs downwardly to the opposite sides of the cutter-bar. Coacting with these guide-members are other guiding-members 16, here shown in the form of fingers, and carried between strips 17, suitably mounted on the upper opposite sides of the cutter-bar casing. These fingers have inner portions cut away and adapted to fit into grooves formed on the surface of the feed-rolls 5, the arrangement being such that the web is directed downwardly between the two sets of fingers and the guiding-members 12, to opposite sides of the cutter-bar. This bar is mounted for adjustment both vertically and longitudinally upon suitable bearings such as screws 18, provided with jam-nuts and threaded into the casing at opposite ends of the bar. The opposite edges of the cutter-bar are serrated or otherwise arranged to constitute reversible or interchangeable cutting surfaces or blades 19 and 20, and these coact with similarly formed blades 21, mounted adjustably upon rolls 22. These rolls are journaled suitably in the casing on opposite sides of the cutter-bar and are driven, through gearing, from a suitable source of power, indicated as a driving-pinion 23. As best seen in Figs. 1 and 4, the drive-pinion is geared with one of the cutter-carrying rolls 22. These rolls are geared together and rotate toward each other. The knives are arranged on these rolls suitably, either for direct coaction or alternate coaction with the cutting surface of the bar 14, and are, through intermediate gears 24, in turn geared with the lower feed-rolls 5, causing them to rotate toward each other in the same direction as the cutting-rolls. Guide-rolls 4 being in contact with the rolls 5, rotate toward these rolls, the tension being suitably adjusted through screws 26 arranged suitably on the bearings. The spring and plunger 6 constitutes, with the screw 26, a combined quick separating and adjusting means to place the rolls 4 with relation to the rolls 5.

Means are also provided for positively stripping and carrying the severed sheets in the arrangement which they were in when severed, downwardly to another instrumentality such as an interfolder, not shown. As here disclosed, such means comprise upwardly extending fingers 27, mounted on a shaft 28, the latter adjustably held as by screws 29 mounted in the casing. These screws permit adjusting of the shaft so that the ends of the fingers carried thereby may be suitably placed with relation to grooves carried by the cutter rolls and insure stripping therefrom of any portion of the web that might be inclined to adhere thereto. Downwardly-extending direction fingers 30 are mounted upon a second shaft 31, the latter being loosely journaled in the casing and the outward movement of the ends of the fingers being restricted by the shaft 28, against which the fingers 30 are adapted to rest.

A sprocket 32 disposed upon the end of a shaft 33 is adapted to be connected with a portion of the machine to constitute, with a knife 34, disposed on the shaft, a counting mechanism which is subject-matter of a separate application.

From the foregoing, it will be seen that the present invention constitutes an effectual means of accomplishing the objects and advantages set forth. It has been found in actual practice to be eminently practical and satisfactory, and while the general principles of the invention are herein set forth for illustrative purposes, it will be understood that we do not wish to be limited to the precise form of this disclosure, as many changes in the general structure and arrangement of the parts are contemplated as within the scope of the invention as set forth in the claims.

What we claim is:

1. In a device of the character described, a plurality of cutting members, one of which is stationary and disposed transversely of the path of travel of a web to be cut, said stationary member being adapted to coact with at least two rotatable cutters operatively associated with the stationary cutter.

2. A cutting instrumentality comprising a stationary cutter disposed transversely of the path of travel of a web to be cut; a rotatable cutter mounted for coaction with the stationary cutter on one side thereof; and a rotatable cutter mounted for coaction with the stationary cutter on another side thereof.

3. A cutting instrumentality comprising a stationary cutter disposed transversely of the path of travel of a web to be cut; a rotatable cutter mounted for coaction with the stationary cutter on one side thereof; a rotatable cutter mounted for coaction with the stationary cutter on another side thereof; and means for effecting coaction of the rotary cutters with the stationary cutter.

4. In a device of the character described, a feeding instrumentality adapted to feed a plurality of webs of material to be cut, a stationary cutter disposed between the paths of travel of two of the webs, and rotary cutters disposed on opposite sides of the stationary cutter and adapted to coact therewith.

5. In a device of the character described, a feeding instrumentality adapted to feed a plurality of webs of material to be cut, a stationary cutter disposed between the paths of travel of two of the webs, and rotary cutters, rotatably mounted in operative relation with the stationary cutter and coacting therewith to cut the webs.

6. A cutting instrumentality of the character described comprising a stationary member disposed transversely of the path of travel of a web to be cut, a rotatable cutter-member coacting therewith on one side thereof, a rotatable cutter-member coacting therewith on another side thereof, means for effecting alternate coaction of these cutter-members with the stationary member and means for adjusting the relation of the cutters to the stationary member.

7. A cutting instrumentality of the character described comprising a stationary member disposed transversely of the path of travel of a web to be cut, a rotatable cutter-member coacting therewith on one side thereof, a rotatable cutter-member coacting therewith on another side thereof, means for effecting alternate coaction of these cutter-members with the stationary member, and means for guiding the webs into position to be cut.

8. A cutting instrumentality of the character described comprising a stationary member disposed transversely of the path of travel of a web to be cut, a rotatable cutter-member coacting therewith on one side thereof, a rotatable cutter-member coacting therewith on another side thereof, means for effecting alternate coaction of these cutter-members with the stationary member, and a counting instrumentality associated therewith.

9. A cutting instrumentality comprising a stationary cutter-member disposed transversely of the path of travel of a web to be cut, a cutting edge disposed on two surfaces thereof, a rotatable cutter member coacting with each cutting edge on the stationary member, and means for feeding a web of material to be cut into operative position between each rotatable cutter and each stationary cutting edge.

10. A cutting instrumentality comprising a stationary cutter-member, a cutting edge disposed on two surfaces thereof, a rotatable cutter member coacting with each cutting edge on the stationary member, means for feeding a web of material to be cut into operative position between each rotatable cutter and each stationary cutting edge, and means for guiding a web from the feeding means into position with relation to a stationary cutting blade.

11. A cutting instrumentality comprising a stationary cutter member, cutter blades disposed on two surfaces thereof, a movable cutter member coacting with each cutter blade on the stationary member, means for feeding a web of material to be cut into operative position between each movable and each stationary cutter blade, and means for guiding a web from the feeding means into position with relation to a stationary cutting blade, said means being carried by the stationary cutter member.

12. A cutting instrumentality comprising a stationary cutter member, cutter blades disposed on two surfaces thereof, a movable cutter member coacting with each cutter blade on the stationary member, means for feeding a web of material to be cut into operative position between each movable and each stationary cutter blade, and means for guiding a web from the feeding means into position with relation to a stationary cutting blade, said means being carried by the stationary cutter member and comprising a guide member mounted on the cutter member, and a coacting guide member in spaced relation to the first-mentioned guide member and mounted on the stationary cutter member.

13. In a device of the character described, a feeding instrumentality adapted to feed a plurality of webs of material to be cut, a stationary cutter disposed between the paths of travel of two of the webs, and rotatable cutters disposed on opposite sides of the stationary cutter and adapted to coact therewith, and means for stripping the cut portion of the web from one of the cutter members.

14. In a device of the character described, a feeding instrumentality adapted to feed a plurality of webs of material to be cut, a stationary cutter disposed between the paths of travel of two of the webs, rotatable cutters disposed on opposite sides of the stationary cutter and adapted to coact therewith, means for stripping the cut portion of the web from one of the cutter members, said means comprising a supporting member; and a stripping member mounted thereon and extending into operative relation to one of the cutter members.

15. In a device of the character described, a feeding instrumentality adapted to feed a plurality of webs of material to be cut, a stationary cutter disposed between the paths of travel of two of the webs, rotatable cutters disposed on opposite sides of the stationary cutter and adapted to coact therewith, means for stripping the cut portion of the web from one of the cutter members, said means comprising a supporting member; a stripping member mounted thereon and extending into operative relation to one of the cutter members, and means for adjusting the relation of the stripper member to the cutter member.

16. In a device of the character described, a feeding instrumentality adapted to feed a plurality of webs of material to be cut, a stationary cutter disposed between the paths of travel of two of the webs, rotatable cutters disposed on opposite sides of the stationary cutter and adapted to coact therewith, and means for directing the cut portion of the web away from the cutter members.

17. In a device of the character described, a feeding instrumentality adapted to feed a plurality of webs of material to be cut, a stationary cutter disposed between the paths of travel of two of the webs, rotatable cutters disposed on opposite sides of the stationary cutter and adapted to coact therewith, means for directing the cut portion of the web away from the cutter members, said means comprising a support; a guide member mounted thereon, and means for limiting the movement of the guide member in one direction.

18. A cutting instrumentality including means for feeding a plurality of webs of material to be cut; a stationary cutter disposed transversely of the path of travel of the web to be cut, and between the webs; a rotary cutter coacting with the stationary cutter on one side thereof; and a rotary cutter coacting with the stationary cutter on another side thereof; the webs to be cut passing between the stationary and rotary cutters.

19. In a device of the character described comprising a stationary member, a rotatable cutter-member coacting therewith on one side thereof, a rotatable cutter-member coacting therewith on another side of the stationary member, means for feeding a web of material to be cut into operative relation to the cutter members, said means comprising coacting feed rollers; and means for quickly separating the rollers to facilitate threading a web of material between the rolls.

20. In a device of the character described comprising a stationary member, a rotatable cutter-member coacting therewith on one side thereof, a rotatable cutter-member coacting therewith on another side of the stationary member, means for feeding a web of material to be cut into operative relation to the cutter members, said means comprising coacting feed rolls; and means for quickly separating the rollers to facilitate threading a web of material between the rolls and a cam member included in said means.

In testimony whereof we affix our signatures in presence of two witnesses.

WILLIAM H. CANNARD.
GLENN A. SHAFFER.

Witnesses:
OLIVIA WEBER,
EDGAR H. BEMERS.